United States Patent [19]

Yamaoka et al.

[11] Patent Number: 4,727,759
[45] Date of Patent: Mar. 1, 1988

[54] POWER TRANSMISSION MECHANISM FOR A TRACTOR

[75] Inventors: Kojiro Yamaoka, Nishinomiya; Shusuke Nemoto, Yao, both of Japan

[73] Assignee: Kanzaki Kokyukoki Mfg. Co. Ltd., Amagasaki, Japan

[21] Appl. No.: 897,859

[22] Filed: Aug. 19, 1986

[30] Foreign Application Priority Data

| Aug. 27, 1985 | [JP] | Japan | 60-131169 |
| Aug. 28, 1985 | [JP] | Japan | 60-132403 |
| Aug. 31, 1985 | [JP] | Japan | 60-192754 |
| Aug. 31, 1985 | [JP] | Japan | 60-133908 |
| Aug. 31, 1985 | [JP] | Japan | 60-133909 |

[51] Int. Cl.⁴ .................. F16H 37/00; F16H 47/00
[52] U.S. Cl. ........................ 74/15.2; 74/718; 74/15.4
[58] Field of Search .......... 74/718, 15.2, 15.4, 74/15.66, 15.63

[56] References Cited

U.S. PATENT DOCUMENTS

| 3,196,696 | 7/1965 | Ritter | 74/15.63 |
| 4,292,855 | 10/1981 | Murayama | 74/15.4 |
| 4,304,141 | 12/1981 | Tone et al. | 74/15.2 |
| 4,513,834 | 4/1985 | Hayashi et al. | 180/70.1 |
| 4,610,174 | 9/1986 | Takagi et al. | 74/15.2 |
| 4,631,980 | 12/1986 | Ishimori | 74/718 X |

FOREIGN PATENT DOCUMENTS 909159 10/1962 United Kingdom ............. 74/15.4

Primary Examiner—Dirk Wright
Attorney, Agent, or Firm—Saidman, Sterne, Kessler & Goldstein

[57] ABSTRACT

A front and rear transmission casing are joined to form a single casing. Upper and lower input shafts are received and supported by the front casing. The lower input shaft drives a change speed gearing with a speed change shaft and a pinion shaft. The pinion shaft has a pinion gear located on a further end of the shaft and engages a ring gear of a differential. The upper input shaft drives a clutch driven shaft through a PTO clutch unit. A rear PTO shaft is driven by the clutch driven shaft and extends out of the rear casing. A mid PTO shaft is also driven by the clutch driven shaft and extends out of the front casing.

6 Claims, 15 Drawing Figures

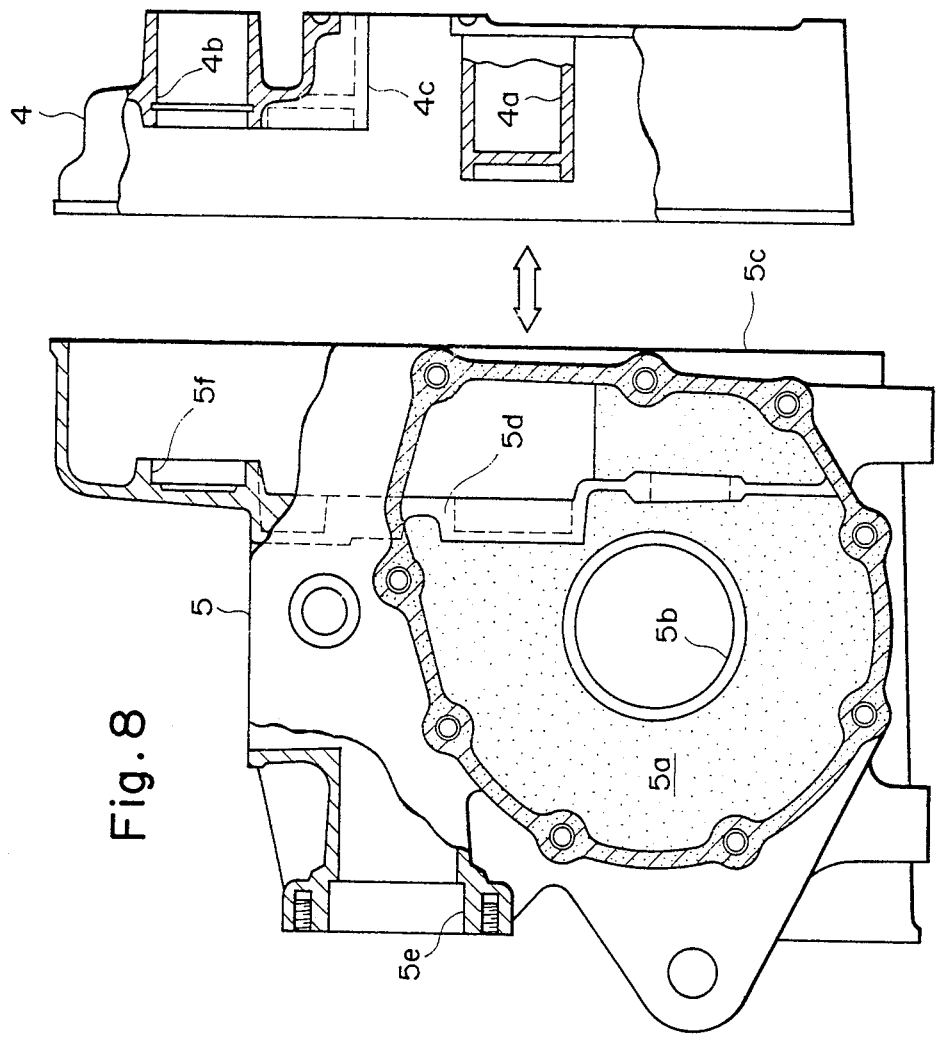

POWER TRANSMISSION MECHANISM FOR A TRACTOR

BACKGROUND OF THE INVENTION

This invention relates to a HST system driven tractor which interposes therein a HST type speed changer to steplessly change the driving speed forwardly and backwardly, in which a driving power transmission route and a PTO (power take off) power transmission route are branched from a pump shaft and a motor shaft at the HST type speed changer, so that both the driving power transmission routes are effectively arranged in double steps in a transmission casing.

The conventional driving power transmisison structure providing the HST type speed changer in a small tractor is well known as disclosed in the U.S. Pat. Nos. 4,304,141 and 4,513,834.

Such prior art also branches the PTO system power transmission route and drive system power transmission route from the pump shaft and motor shaft at the HST type speed changer, but since the PTO system and drive system are arranged longitudinally of the tractor body, the transmission casing becomes longitudinally longer and a mid PTO shaft is disposed in front thereof to place a lawn mower frontward of the tractor body, resulting in that there is an inconvenience that a wheelbase between the front and rear wheels is larger.

SUMMARY OF THE INVENTION

An object of the invention is to provide a power transmission mechanism for a tractor which arranges the PTO power transmission unit longitudinally of the tractor body and in a space around a differential gear unit left as dead space in the prior art, so that the drive system and PTO system, even when juxtaposed with each other, reduces the transmission casing in length and the mid PTO shaft is arranged rearwardly, thereby enabling the wheel-base to be reduced even when the mower is arranged.

Also, the arrangement of the PTO system toward a rear axle can reduce a rear PTO shaft 1 projecting rearwardly to the predetermined position in length more than the conventional one and also the mid PTO shaft is positioned more rearwardly than the conventional one, whereby even when a mix-mount mower is mounted, there is no need of taking a larger wheel-base as conventional between the front and rear wheels.

The above and further objects and novel features of the invention will more fully appear from the following detailed description in connection with the accompanying drawings.

BRIEF DESCRIPTION OF THE DRAWINGS

FIG. 8 is an exploded sectional side view of a front transmission casing and a rear transmission casing.

DESCRIPTION OF THE PREFERRED EMBODIMENT

Next, explanation will be given on structure of an embodiment of the invention and operation thereof in accordance with the accompanying drawings.

Figure 1:
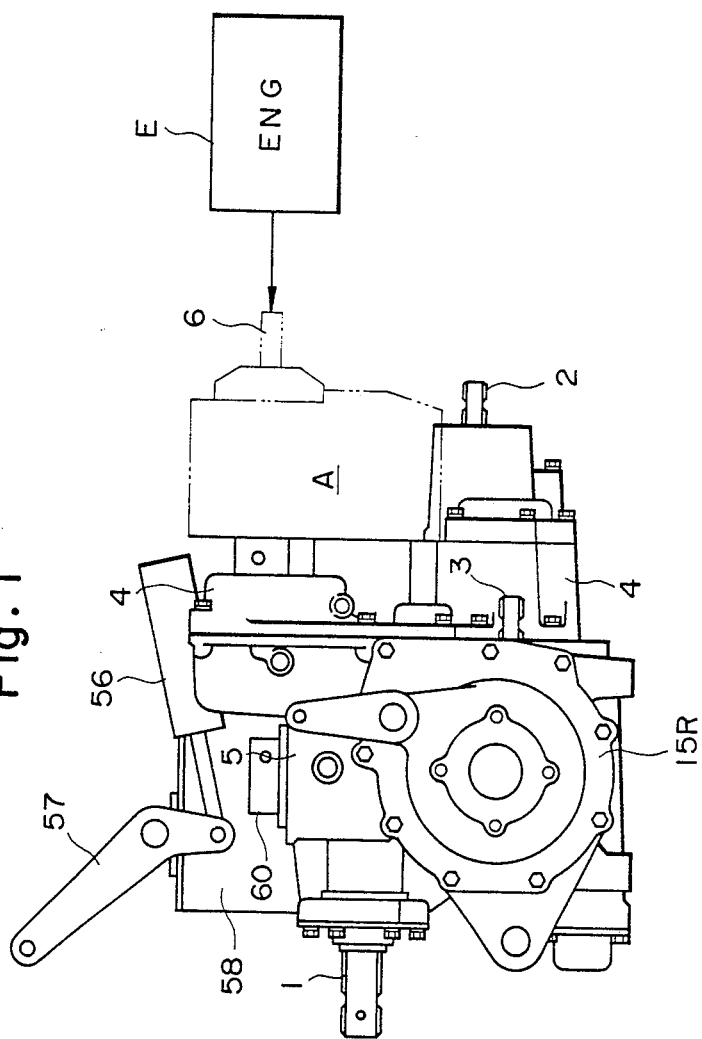
FIG. 1 is a side view of a power transmission mechanism for a tractor of the invention.
Figure 2:
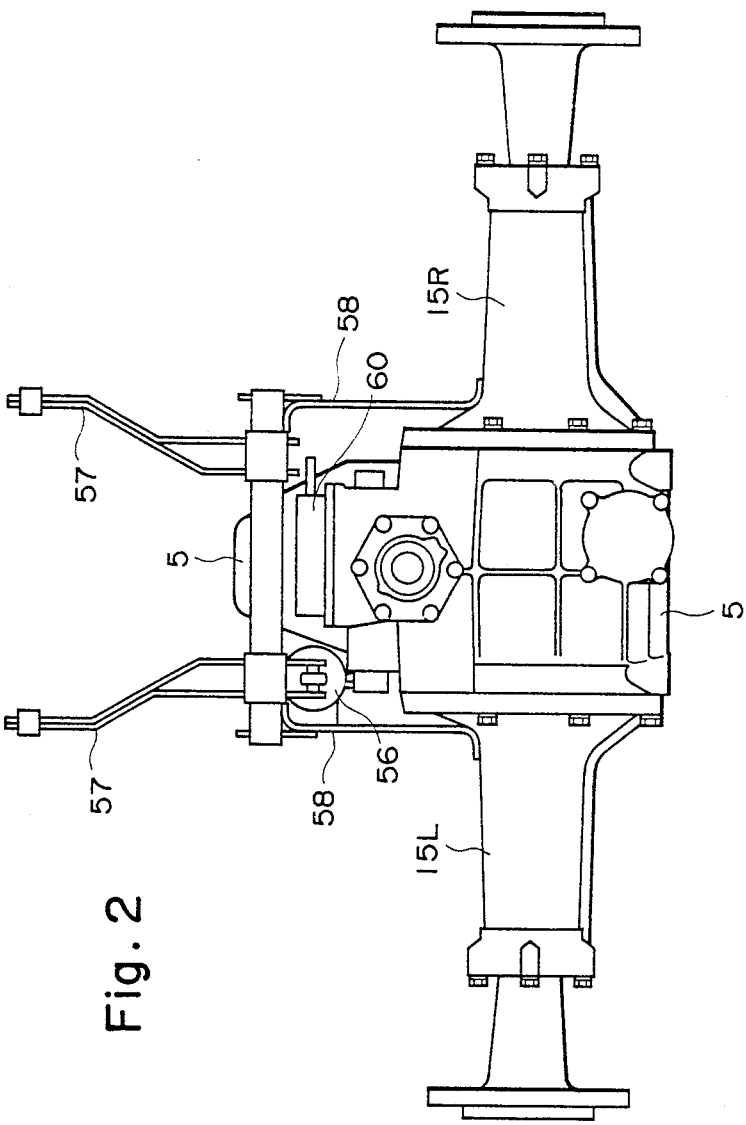
FIG. 2 is a rear view of the same.

Referring to FIGS. 1 and 2, a front transmission casing 4 and a rear transmission casing 5 constitute a transmission casing, the front transmission casing 4 mainly housing therein a driving speed changing system and the rear transmission unit 5 constituting therein a PTO transmission system. A HST type speed changer A is fixed to the front of the front transmission casing 4 and a driving power is transmitted to a pump shaft 6 at the speed changer A from an engine E. In the drawings, reference numeral 2 designates a front wheel driving power output shaft, 1 designates a rear PTO (power take off) shaft, and 3 designates a mid PTO shaft.

Referring to FIG. 1, explanation will be given on a hydraulic lift unit provided rearwardly upwardly of the rear transmission casing 5.

At the upper surface of the rear transmission casing 5 is fixed a control valve 60 for the hydraulic lift unit, and at the lateral side of the rear transmission casing 5 is provided a hydraulic cylinder 56. Lift arms 57 connected to a piston of the hydraulic cylinder 56 are pivoted at the base ends to the rear end of the support brackets 58, thereby vertically rotating at the fore ends of the lift arms 57 by expansion of the piston.

Figure 5:
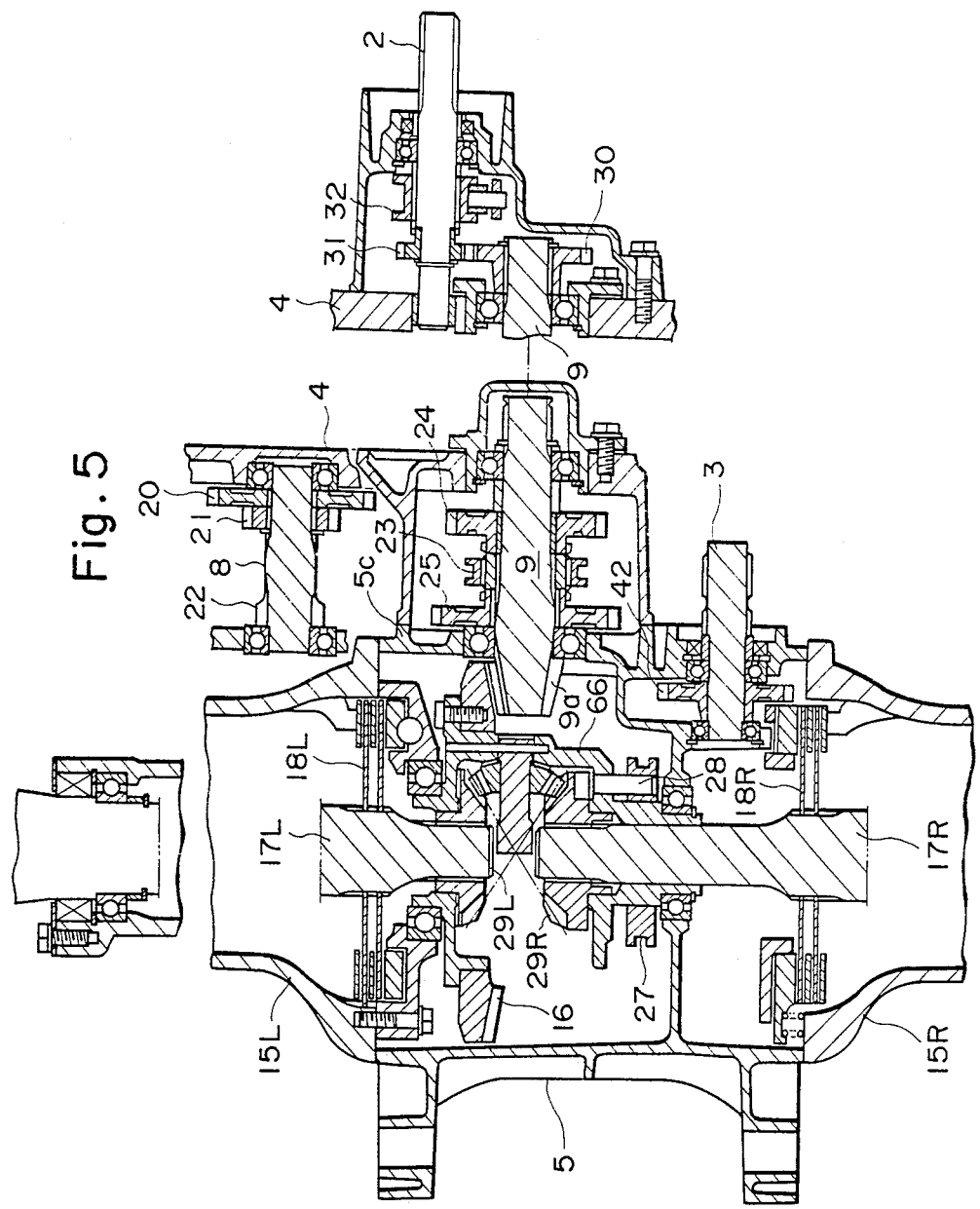
FIG. 5 is a sectional plan view of a differential gear unit.

Next, the driving power transmission route will be described with reference to FIGS. 3 and 5.

The rotation after changing the speed is transmitted into the front transmission casing 4 through a motor shaft 7 disposed at the lower portion of HST type speed changer A. A fixed gear 19 at the rear end of motor shaft 7 engages with a fixed gear 20 on a speed change shaft 8, thereby driving other fixed gears 21 and 22. The fixed gears 21 and 22 engage with freely fitting gears 24 and 25 respectively, so that a rotary shaft 23a shown in FIG. 6 rotates to move a speed change slider 2 axially through a shifter arm 23b, thereby performing the speed change in two steps. A pinion 9a on a rotatable pinion shaft 9 engages with a differential ring gear 16 at a differential gear unit, and axles 17L and 17R are driven thereby and carry brake plates 18L and 18R at a steering brake unit respectively. In addition, in the drawings, reference numeral 26a designates a rotary shaft for operating a diff. lock shifter 26, 27 designates a diff. lock slider, 28 designates a diff. lock pin, and 15L and 15R designate axle housings fixed to both lateral sides of the rear transmission casing 5.

Figure 6:
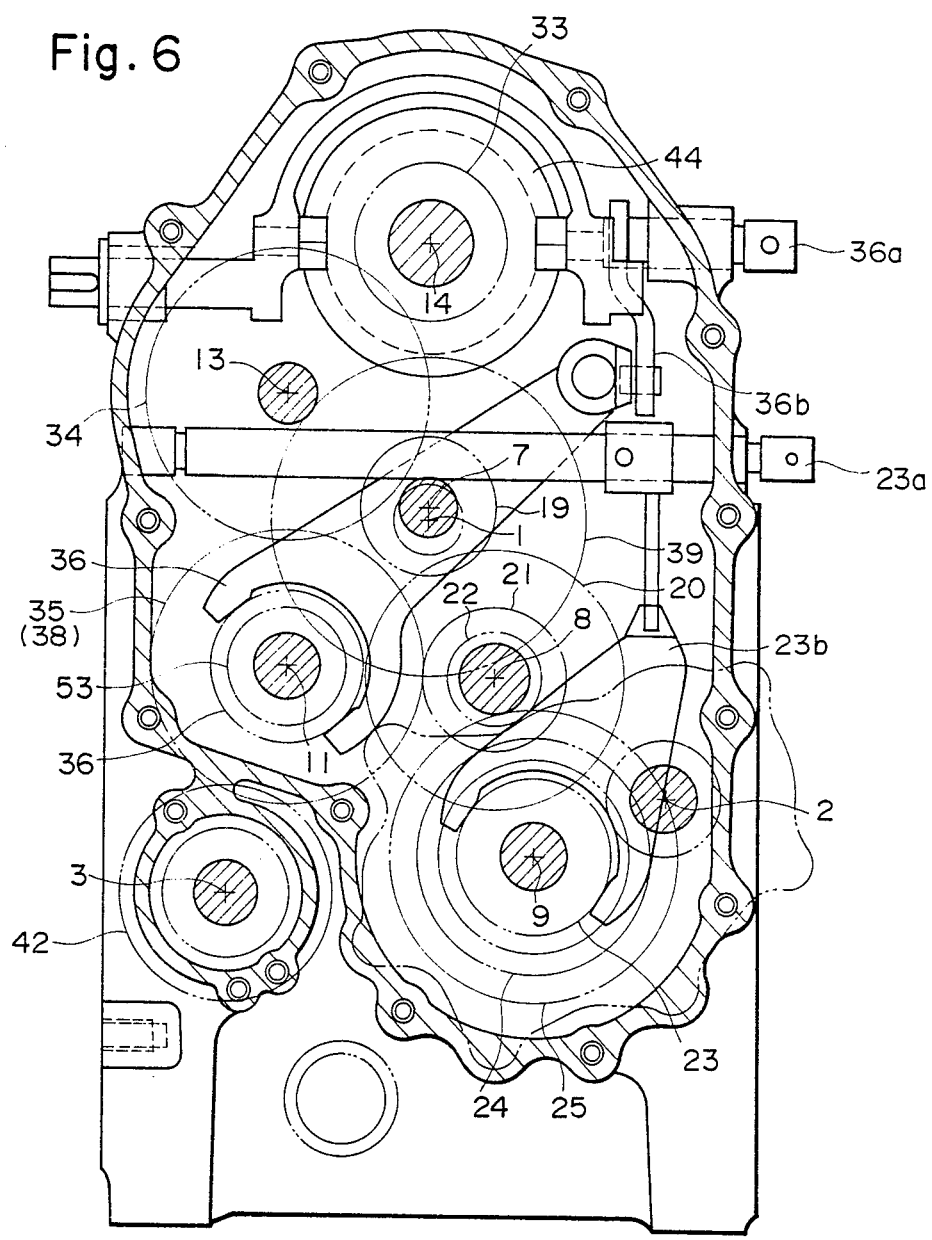
FIG. 6 is a front view of shafts arranged in the transmission casing of the invention.

The pinion shaft 9 projecting from the front transmission casing 4 is provided at the fore end with splines, so that when the front wheel drive is required, the front wheel driving power output shaft 2 is added. Hence, a fixed gear 30 is fixed on the splines and engages with a freely fitting gear 21 on the output shaft 2, whereby a clutch slider 32 is moved back and forth to transmit the driving power to the front wheel driving power output shaft 2 in an off-and-on way. The front wheel driving power output shaft 2, as shown in FIG. 6, is positioned laterally of the pinion shaft 9 and the left hand side in the forward direction, the mid PTO shaft 3 being disposed at the right hand side in the same direction.

Next, explanation will be given on a PTO driving system in accordance with FIG. 4.

The pump shaft 6 projects from the upper portion of HST type speed changer A and enters into the front transmission casing 4 so as to transmit the driving power through a coupling to a clutch driving shaft 12 at a PTO clutch unit to be discussed below. The driving power from the PTO clutch unit is output through a fixed gear 33 on a clutch driven shaft 14.

The fixed gear 33 at the end of the clutch drive shaft 14 engages with a gear 34 on a counter shaft 13 so that the gear 34 transmits rotation to a freely fitting gear 38 on a PTO changeover shaft 11. A rotary shaft 36a shown in FIG. 6 rotates to move the changeover slider 36 back and forth through a shifter arm 36b to changeover the case where the driving power is transmitted to a freely fitting gear 35 on the freely fitting gear 38 and the case where the same is transmitted from a fixed gear 37 on the PTO changeover shaft 11 to a fixed gear 39 on the rear PTO shaft 1 through a fixed gear 53 toothed on the changeover shaft 11, the freely fitting gear 35 engaging with a fixed gear 42 on the mid PTO shaft 3 to thereby drive the mid PTO shaft 3.

Figure 4:
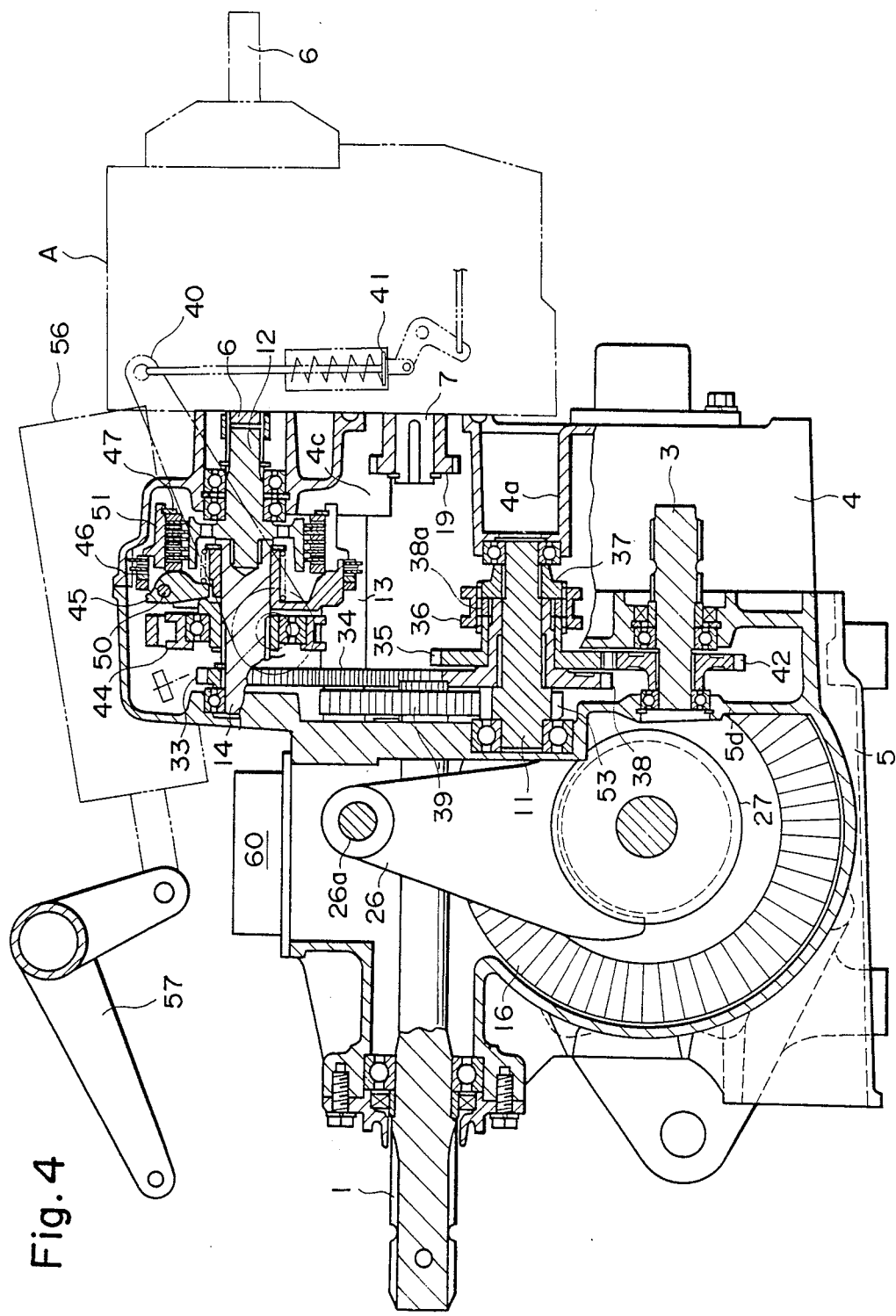
FIG. 4 is a PTO driving system therein.

In FIG. 4, reference numeral 40 designates a PTO clutch lever for operating a slider 44, and 41 designates a buffer to buffer abrupt off-and-on operation of the clutch.

Next, explanation will be given on the arrangement of shafts at the driving and PTO systems in accordance with FIGS. 6 and 7.

FIG. 6 is a front view of the mission casing, in which at the uppermost portion are disposed the pump shaft 6, clutch driving shaft 12 and clutch driven shaft 14 in relation of being coaxial, and the counter shaft 13 is disposed rightwardly downwardly in the forward direction. The PTO changeover shaft 11 is disposed just below the counter shaft 13 so that the rotation after changed over by the changeover unit on the PTO changeover shaft 11 is transmitted to the rear PTO shaft 1 disposed slantwise upwardly thereof and mid PTO shaft 3 slantwise downwardly of the same.

Conventionally, the PTO system driving power transmission route is not disposed around the pinion shaft 9 and differential gear unit at the drive system power transmission route. The present invention, however, arranges the PTO driving power transmission unit in double when laterally viewed within a space surrounding the engagement of the pinion 9a with the differential ring gear 16. Hence, the transmission casing is made smaller in longitudinal length.

The speed change shaft 8 is disposed under the motor shaft 7 and further the pinion shaft 9 thereunder. Also, the front wheel driving power output shaft 2 is disposed slantwise upwardly of the pinion shaft 9 in case of need of front wheel drive.

Figure 7:
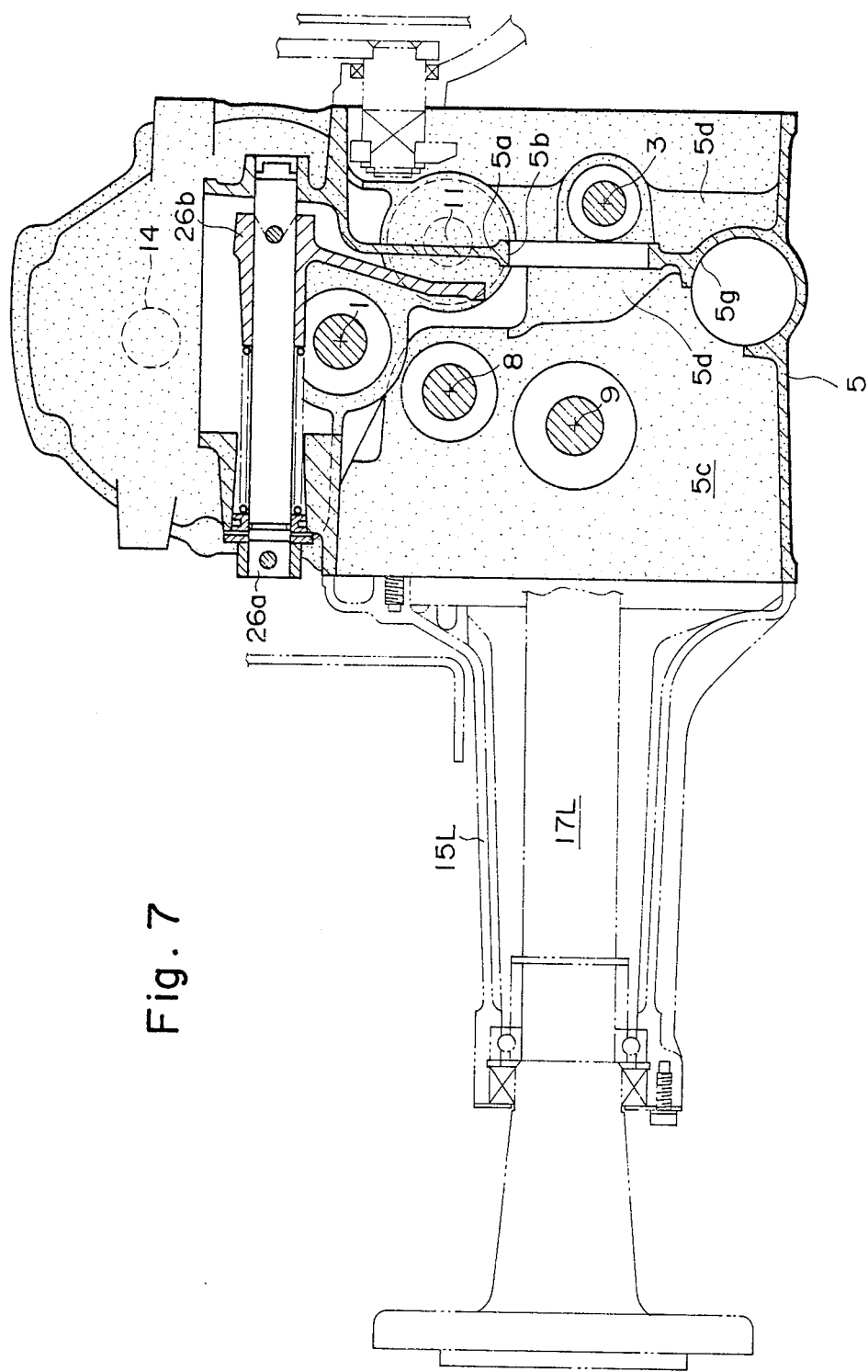
FIG. 7 is a rear view of the shafts arranged in the same.
Figure 10:
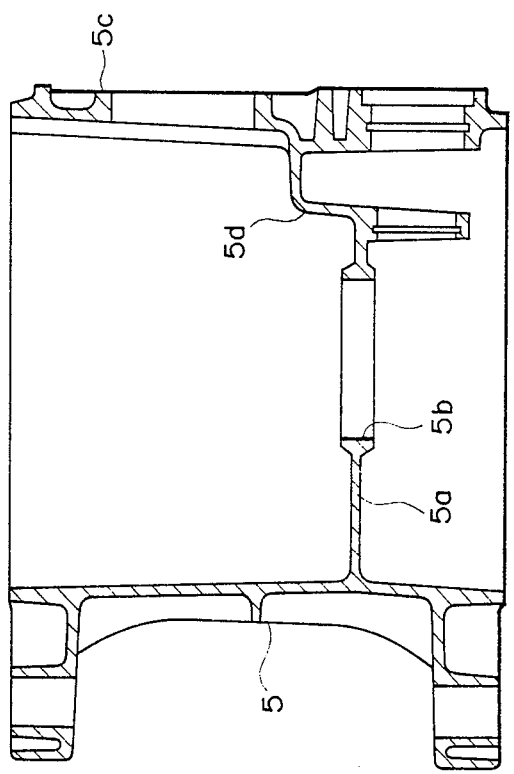
FIG. 10 is a sectional plan view thereof.
Figure 9:
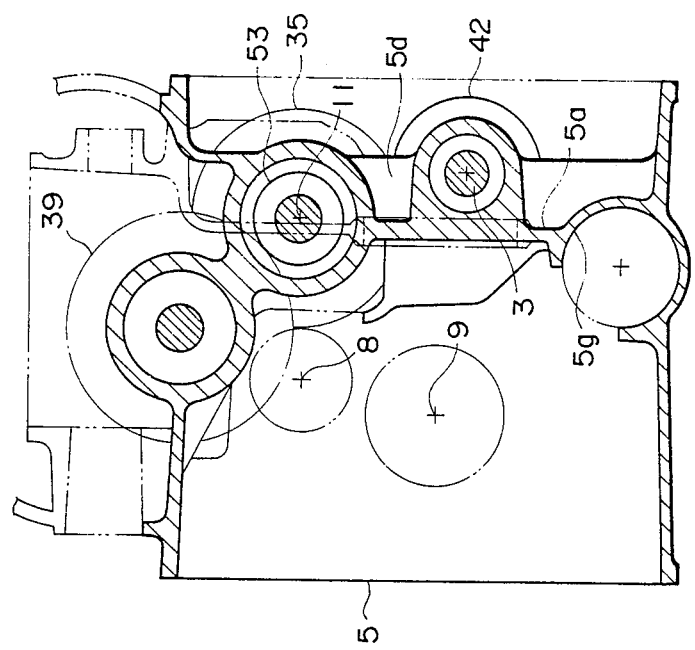
FIG. 9 is a sectional rear view of the rear transmission casing.

The rear transmission casing 5 is constructed as shown in FIGS. 7, 9 and 10, which comprises first right and left vertical walls 5c at the lateral sides, second right and left vertical walls 5d at the lateral sides, and front and rear vertical walls 5a at the longitudinal sides. In detail, each second vertical wall 5d smaller in lateral length than each first vertical wall 5c is integral with the rear portion thereof and also integral with the vertical wall 5a.

Figure 3:
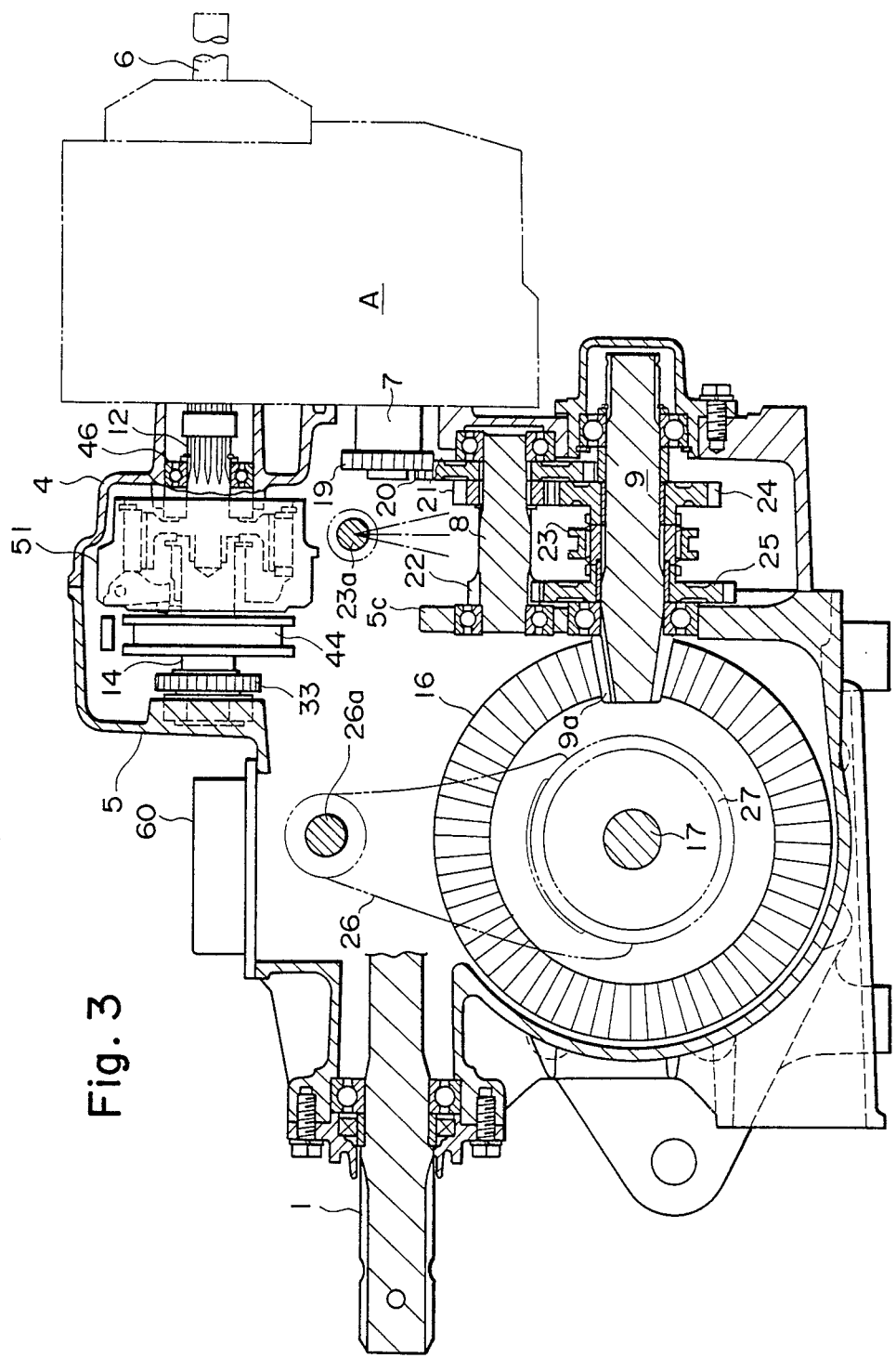
FIG. 3 is a sectional side view of a driving system in a transmission casing.

The front transmission casing 4 and first right and left vertical walls 5c are dividable therebetween as shown in FIG. 8, and the pinion shaft 9 and speed change shaft 8 are supported therebetween as shown in FIG. 3. The clutch driving shaft 12 at the PTO clutch unit is supported to a shaft holder 4b at the front transmission casing 4, the clutch driven shaft 14 being supported to a shaft holder 5f at the rear transmission casing 5, the counter shaft 13 being supported between the projecting support 4c of the front transmission casing 4 and the second lateral vertical walls 5d at the rear transmission casing 5, the rear PTO shaft 1 being supported between the second lateral vertical walls 5d and a shaft holder 5e formed at the rear end wall at the rear transmission casing 5, the PTO changeover shaft 11 being supported by the second right and left vertical walls 5d at the rear transmission casing 5 and a projecting support 4a at the front transmission casing 4, the mid PTO shaft 3 being supported between the first right and left verical walls 5c and the second right and left vertical walls 5d, and the rear transmission casing 5 further having a support bore 5b for the differential gear unit and a strainer inserting bore 5g for an operating oil.

Next, explanation will be given on the construction of the PTO clutch unit in accordance with FIGS. 11 and 12.

At the rear end of the clutch driving shaft 12 is provided a retaining portion 12a for PTO clutch plates 47, between the retaining portion 12a and a retaining portion provided at the inner surface of a clutch housing 51 are interposed the clutch plates 47, at the outer periphery of the clutch housing 51 is provided a retaining portion for PTO brake plates 46, and between the retaining portion therefor and a retaining portion provided at the front mission casing 4 are interposed the brake plates 46.

PTO clutch urging levers 45 are pivoted at three places to the clutch housing 51 through pivot pins 50 respectively, whereby each PTO clutch urging lever 45 itself rotates together with the clutch housing 51 around the shaft 14.

When the PTO clutch urging lever 45 is pushed rightwardly through the PTO slider against a spring 48, the PTO clutch plates 47 are urged by the first projection 45a at the clutch urging lever 45, thereby connecting the clutch driving shaft 12 and clutch driven shaft 14 integrally with each other. When the PTO slider 44 retracts leftwardly, the spring 48 fitted onto the shaft 14 pushes the inner end of the PTO clutch urging lever 45 and a second projection 45b formed at the outer end of PTO clutch urging lever 45 urges the PTO brake plates 46, thereby exerting the rotating braking action simultaneously with disconnection of PTO clutch.

The PTO slider 44 need not rotate together with the clutch driven shaft 14, and pushes a pusher 49 through a bearing 54, but is constructed not to rotate, the pusher 49 providing a projection for pushing therethrough the PTO clutch urging lever 45.

Figure 11:
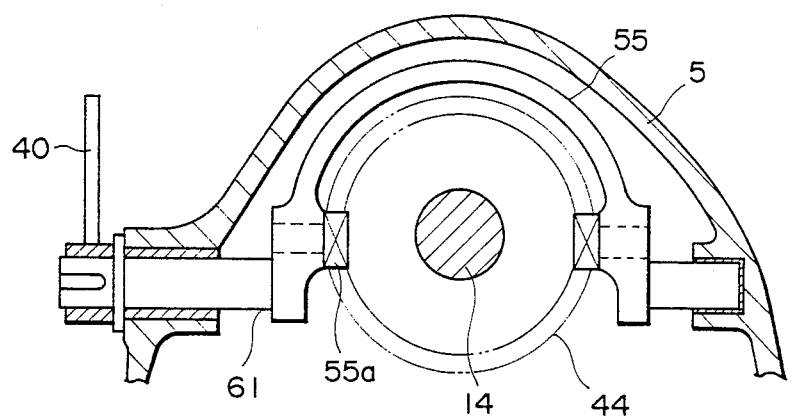
FIG. 11 is a partially sectional view of a control for a PTO clutch unit.
Figure 12:
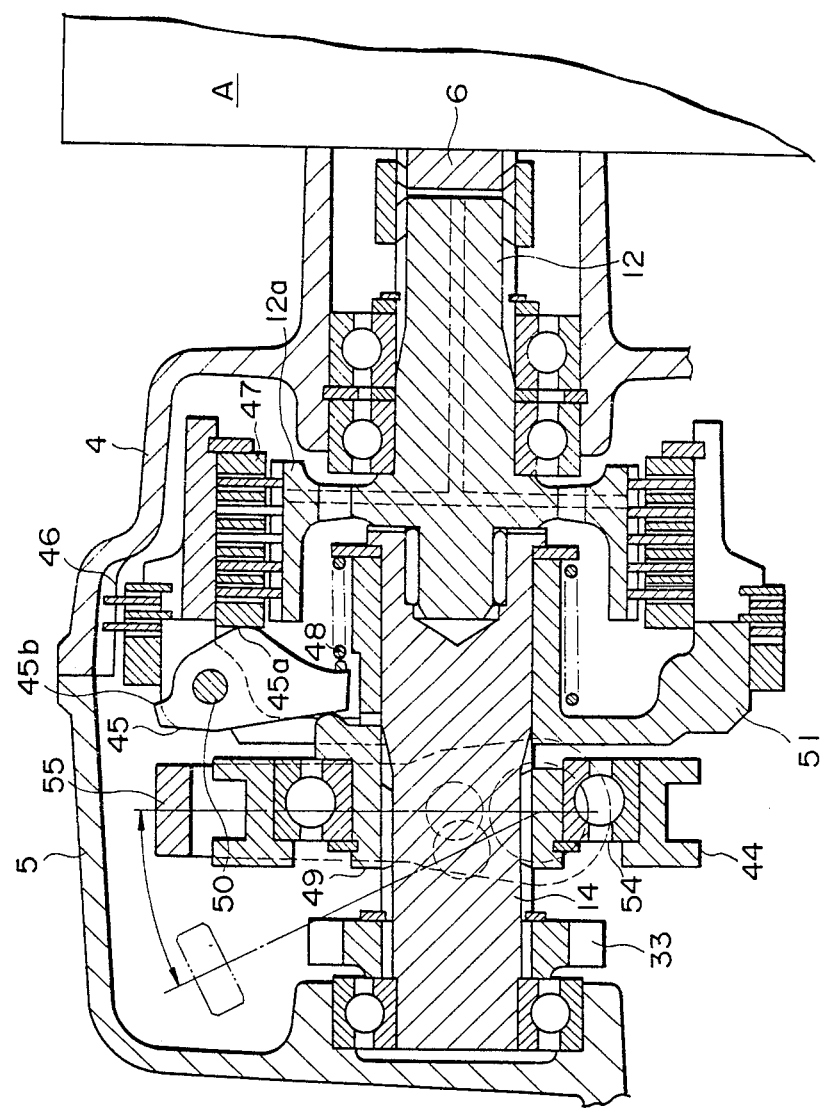
FIG. 12 is an enlarged sectional side view of the PTO clutch unit in part.

FIG. 11 shows an operation mechanism for moving the PTO slider 44 back and forth, in which an arm shaft 61 is integral with a shifter arm 55 having engaging portions 55a to be fitted into grooves at the PTO slider 44, supported to the rear transmission casing 5, and projects at one end outwardly therefrom to carry an operating lever 4.

Figure 13:
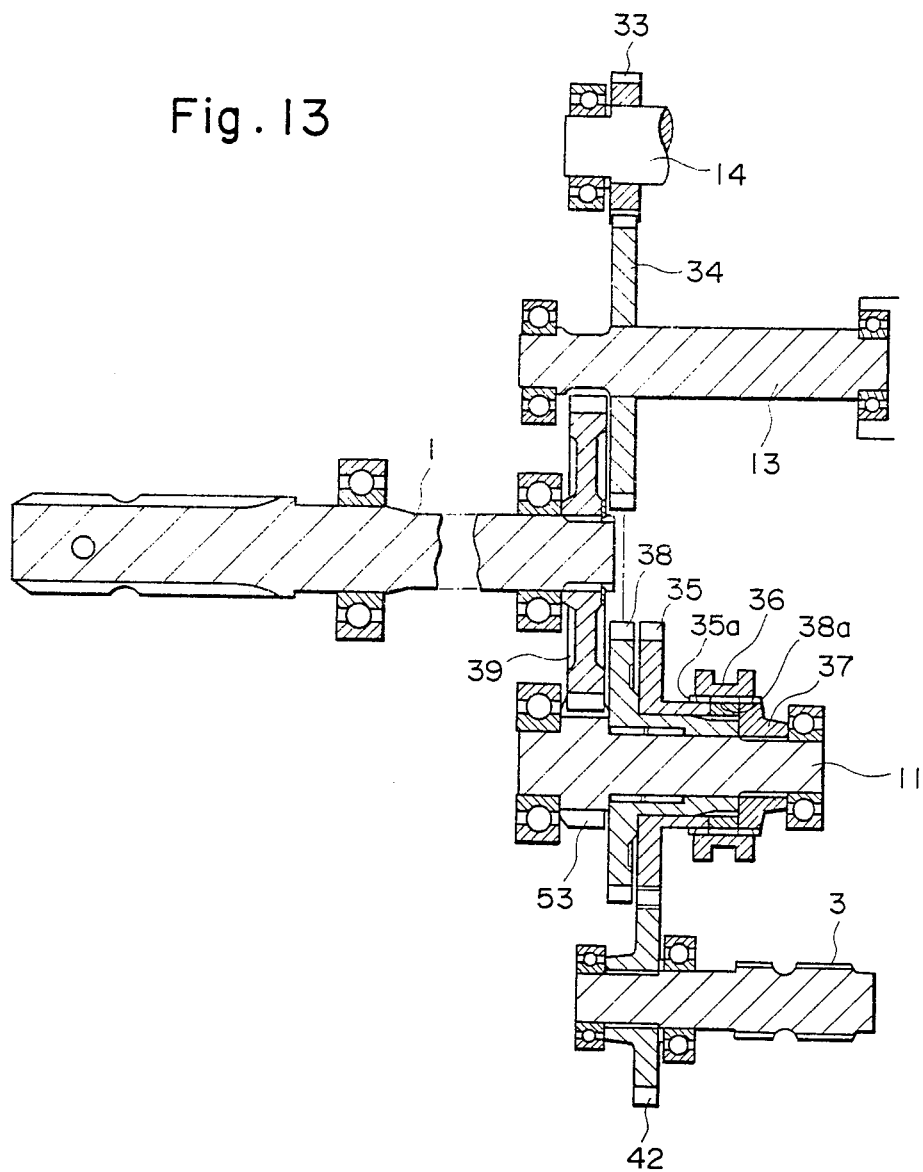
FIG. 13 is a side view of shafts and gears only in the PTO drive system.

Referring to FIG. 13, the shafts and gears of the PTO transmission system are taken out and shown for easy understanding.

Next, explanation will be given on the steps of assembling the lateral steering brake unit with the differential gear unit.

The differential gear unit comprises a diff. pinion shaft, a diff. pinion, and a diff. side gears 29L and 29R housed in a diff. casing 66, so that when the ring gear 16 rotates to cause a difference in running resistance between the axles at both lateral sides of ring gear 16, differential rotation occurs.

The differential gear unit is supported at the left end by a brake casing 62 and fixed by the axle housing 15L and at the right end to the front and rear vertical walls 5a at the rear transmission casing 5 through bearings 69.

The brake casings 62 are fixed to the inner end of the axle housing 15, but not to the rear transmission casing 5. Also, the left end of the differential gear unit is supported through a bearing 64 to the brake casing 62 projecting from the axle housing 15L. Therefore, when the axle housing 15L is removed, the brake casing 62 also is removed so as to largely open the lateral side of the rear transmission casing 5, thereby enabling the differential gear unit to be taken out through the opening.

The left-side brake casing 62 serves also as the bearing for the differential gear unit. The cam rotary plate 65L is rotated by the brake lever, thereby urging the brake plates 18L through cam balls 63.

The right-hand brake unit similarly has the brake casing 67 fixed to the inner surface of the axle housing 15R, the brake casing 67 not serving as the bearing for the differential gear unit. A cam rotary plate 65R and cam balls 63, are interposed between the brake casing 67 and the axle housing 15R, the brake lever rotates the cam rotational plate 65R, and the cam balls 63 are pushed out, thereby exerting the braking action.

Figure 14:
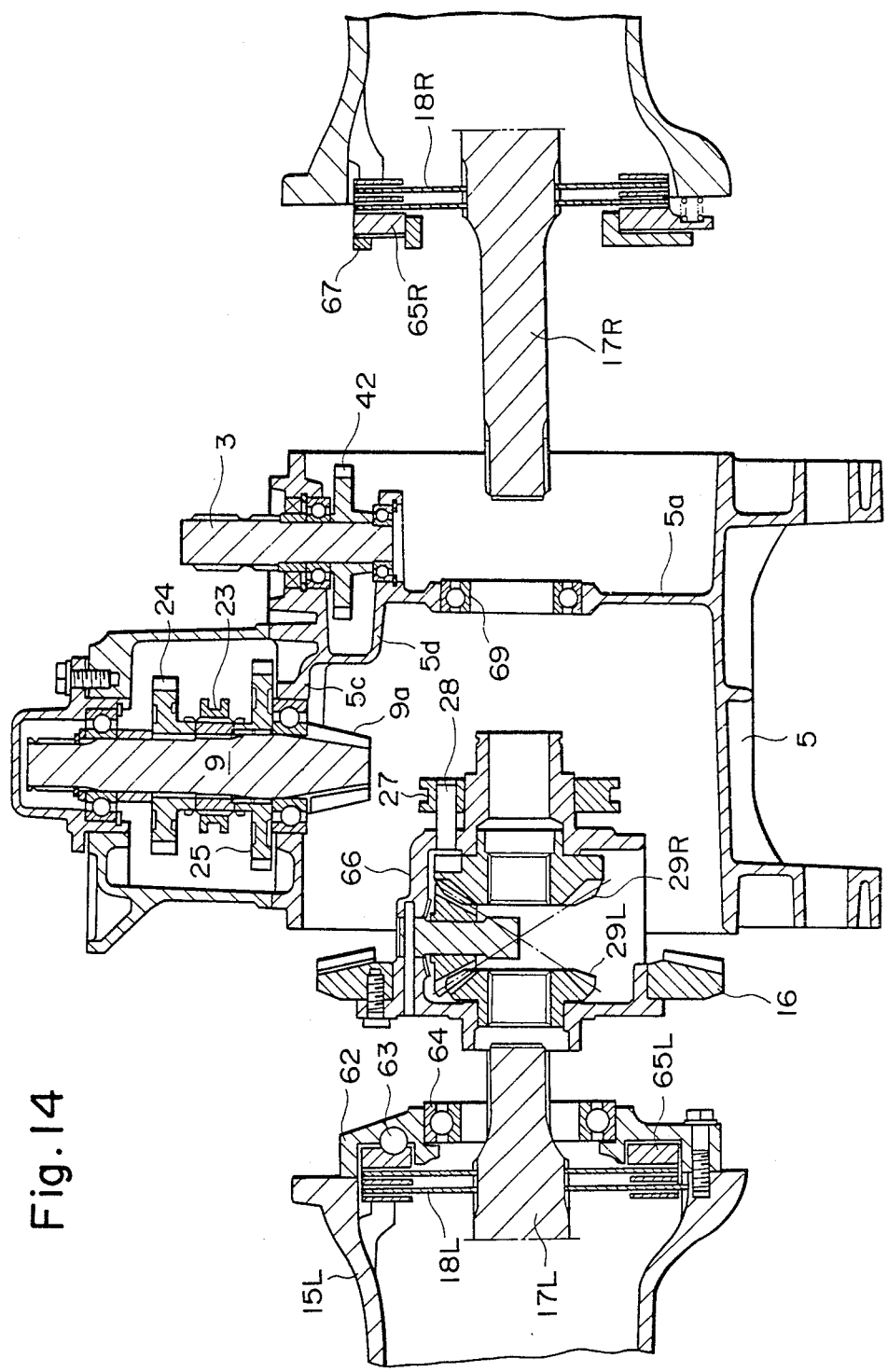
FIG. 14 is a sectional plan view of the differential gear unit in assembly.

Next, explanation will be given on the assembly procedure for the differential gear unit and axle housings 15L and 15R with respect to the rear transmission casing 5 in accordance with FIG. 14.

The right and left brake units are integral with the right and left axle housings 15L and 15R respectively, whereby they can be preassembled at other places. Hence, they are sequentially inserted to be fixed to the rear transmission casing 5 for easy assembly.

Figure 15:
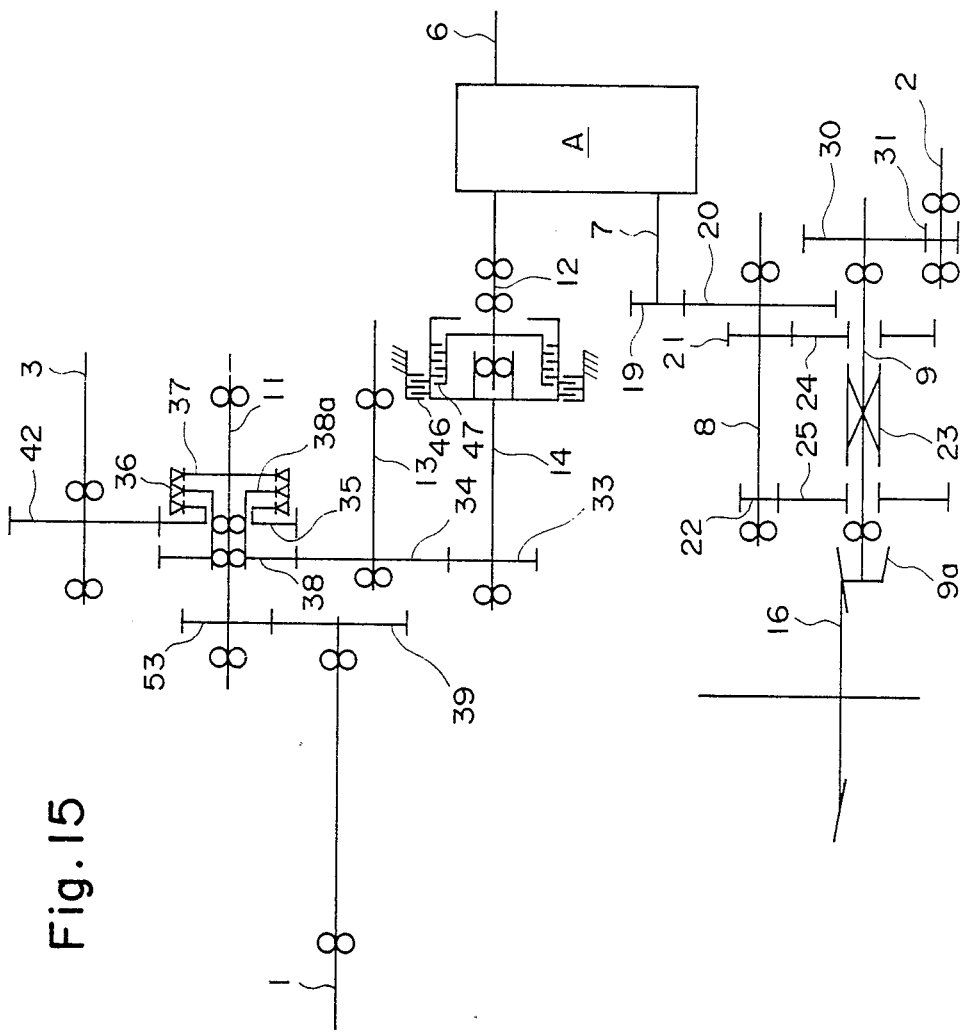
FIG. 15 is a schematic diagram of the power transmission mechanism of the invention.

FIG. 15 is a schematic diagram of structure of the power tranmission mechanism of the present invention.

In the above construction, the mid PTO shaft 3 does not project from the lower part of the transmission casing, thereby ensuring the lowest height from the ground.

Since the PTO changeover shaft 11 is disposed between the rear PTO shaft 1 and the mid PTO shaft 3, there is no need of providing the counter shafts between the PTO changeover shaft 11 and the rear PTO shaft 1 and between the PTO changeover shaft 11 and the mid PTO shaft 3, whereby the rear PTO shaft 1 and mid PTO shaft 3 can be disposed at the optimum places respectively.

The axle housing 15L supports the differential gear unit at one side thereof and the differential gear unit together with the axle housing 15L is removable so that the opening for inserting therethrough the differential gear unit is used also as the opening at one side of the transmission casing for mounting the differential gear unit, whereby there is no need of providing the particular opening for inserting therethrough the differential gear unit at the front or the upper surface of the transmission casing, thereby nor weakening strength of the transmission casing.

Since the right and left steering brake casings 62 and 67 are integrally fixed to the inner surfaces of the axle housings 15L and 15R, the differential gear unit and right and left axle housings 15L and 15R are separately assembled so that the parts after integral assembly are incorporated in the transmission casing, thereby facilitating the assembly.

A large trouble may occur by an unexpected rotation of the mower caused by together rotation of PTO shaft when the clutch is disconnected, but the present invention exerts the together rotatable braking action simultaneously with disconnection of the PTO clutch unit, thereby enabling such trouble to be prevented.

Also, the PTO clutch urging lever swings vertically to carry out at one stroke the off-and-on operation of the PTO clutch and the braking action of together rotation, thereby simplifying the clutch brake in construction, saving the number of parts, and making the PTO clutch unit inexpensive to produce.

The PTO clutch unit and together rotation preventing brake unit are constructed in and out the clutch housing 51, whereby a space is longitudinally restricted to enable a compact PTO clutch unit to be formed and the transmission casing need not be enlarged.

While an embodiment of the invention has been shown and described, the invention is not limited to the specific construction thereof, which is merely exemplary in the specification rather than defined.

What is claimed is:

1. A power transmission mechanism for a tractor, comprising:
   a front transmission casing;
   a rear transmission casing;
   means coupling said front transmission casing to said rear transmission casing to define a single transmission casing;
   means for receiving and supporting an upper rotatable input shaft near the top of said front casing;
   means, located generally below said coupling means, for receiving and supporting a lower rotatable input shaft in said front casing;
   a drive-speed changing unit comprising:
     (a) a speed change shaft, driven by said lower input shaft, located generally below and to the side of said lower input shaft; and
     (b) a pinion shaft, driven by said speed change shaft, located generally below and to the side of said speed change shaft;
   a pinion gear on the end of said pinion shaft that extends toward said rear casing;
   a differential gear unit supported within said rear casing, said differential gear unit comprising a ring gear driven by said pinion gear;
   a PTO clutch unit with a clutch shaft coupled to said upper input shaft;
   a clutch driven shaft extending from said PTO clutch unit;
   a rear PTO shaft located generally below said clutch unit and extending out of said rear casing;

a fixed gear on said rear PTO shaft located at the end of said rear PTO shaft nearest said clutch unit;
a mid PTO shaft located generally below said rear PTO shaft and beside said pinion shaft, and extending out of said front transmission casing;
a fixed gear on said mid PTO shaft; and
drive means coupling said clutch driven shaft to said mid PTO shaft, and to said rear PTO shaft.

2. A power transmission mechanism for a tractor, comprising:
a front transmission casing;
a rear transmission casing;
means coupling said front transmission casing to said rear transmission casing to define a single transmission casing;
means for receiving and supporting an upper rotatable input shaft near the top of said front casing;
means, located generally below said coupling means, for receiving and supporting a lower rotatable input shaft in said front casing;
a drive-speed changing unit comprising:
  (a) a speed change shaft, driven by said lower input shaft, located generally below and to the side of said lower input shaft; and
  (b) a pinion shaft, driven by said speed change shaft, located generally below and to the side of said speed change shaft;
a pinion gear on the end of said pinion shaft that extends toward said rear casing;
a differential gear unit supported within said rear casing, said differential gear unit comprising a ring gear driven by said pinion gear;
a PTO clutch unit with a clutch shaft coupled to said upper input shaft;
a clutch driven shaft extending from said PTO clutch unit;
a rear PTO shaft located generally below said clutch unit and extending out of said rear casing;
a fixed gear on said rear PTO shaft located at the end of said rear PTO shaft nearest said clutch unit;
a mid PTO shaft located generally below said rear PTO shaft and beside said pinion shaft, and extending out of said front transmission casing;
a fixed gear on said mid PTO shaft;
a PTO changeover shaft located generally between said rear PTO shaft and said mid PTO shaft;
means for driving said PTO changeover shaft with said clutch driven shaft; and
driving means, on said PTO changeover shaft, for driving said mid PTO shaft and said rear PTO shaft, comprising:
  a first gear, coupled to said clutch driven shaft,
  a second gear, coupled to said mid PTO shaft,
  a third gear, coupled to said rear PTO shaft, and
  a changeover slider, having a first position for engaging said first gear with said second gear, and a second position for engaging said first gear with both said second and said third gears.

3. The power transmission mechanism of claim 2, wherein said means for driving said PTO changeover shaft comprises:
a countershaft with a fixed gear interposed generally between said clutch driven shaft and said PTO changeover shaft.

4. A power transmission mechanism for a tractor as set forth in claim 2, further comprising:
a clutch housing enclosing said PTO clutch unit, and disposed close to said transmission casing;
PTO brake plates interposed between the outer surface of said clutch housing and said transmission casing;
PTO clutch plates interposed between the inner surface of said clutch housing and said clutch shaft;
a PTO clutch urging lever extending across said PTO brake plates and said PTO clutch plates, and coupled to said clutch housing such that said lever pivots between a first position of engagement, with said brake plates, and a second position of engagement, with said clutch plates; and
a PTO clutch slider that slides axially to contact and pivot said PTO clutch urging lever, thereby providing that PTO braking action occurs simultaneously with disengagement of said PTO clutch.

5. A power transmission mechanism for a tractor as set forth in claim 4, further comprising:
means biasing said clutch urging lever normally toward said first position.

6. A power transmission mechanism for a tractor, comprising:
a front transmission casing;
a rear transmission casing;
means coupling said front transmission casing to said rear transmission casing to define a single transmission casing;
means for receiving and supporting an upper rotatable input shaft near the top of said front casing;
means, located generally below said coupling means, for receiving and supporting a lower rotatable input shaft in said front casing;
a drive-speed changing unit comprising:
  (a) a speed change shaft, driven by said lower input shaft, located generally below and to the side of said lower input shaft; and
  (b) a pinion shaft, driven by said speed change shaft, located generally below and to the side of said speed change shaft;
a pinion gear on the end of said pinion shaft that extends toward said rear casing;
a front vertical wall;
a rear vertical wall;
longitudinal vertical walls connecting said front vertical wall and said rear vertical wall;
an axle housing;
a differential gear unit supported within said rear transmission casing by said longitudinal wall and said axle housing, said differential gear unit comprising a ring gear driven by said pinion gear;
a PTO clutch unit with a clutch shaft coupled to said upper input shaft;
a clutch driven shaft extending from said PTO clutch unit;
a rear PTO shaft located generally below said clutch unit and extending out of said rear casing;
a fixed gear on said rear PTO shaft located at the end of said rear PTO shaft nearest said clutch unit;
a mid PTO shaft located generally below said rear PTO shaft and beside said pinion shaft, and extending out of said front transmission casing;
a fixed gear on said mid PTO shaft; and
drive means coupling said clutch driven shaft to said mid PTO shaft, and to said rear PTO shaft.

* * * * *